April 3, 1951 A. H. BRAESEKE 2,547,151
EXTRUDING MACHINE
Filed Sept. 15, 1945 4 Sheets-Sheet 1
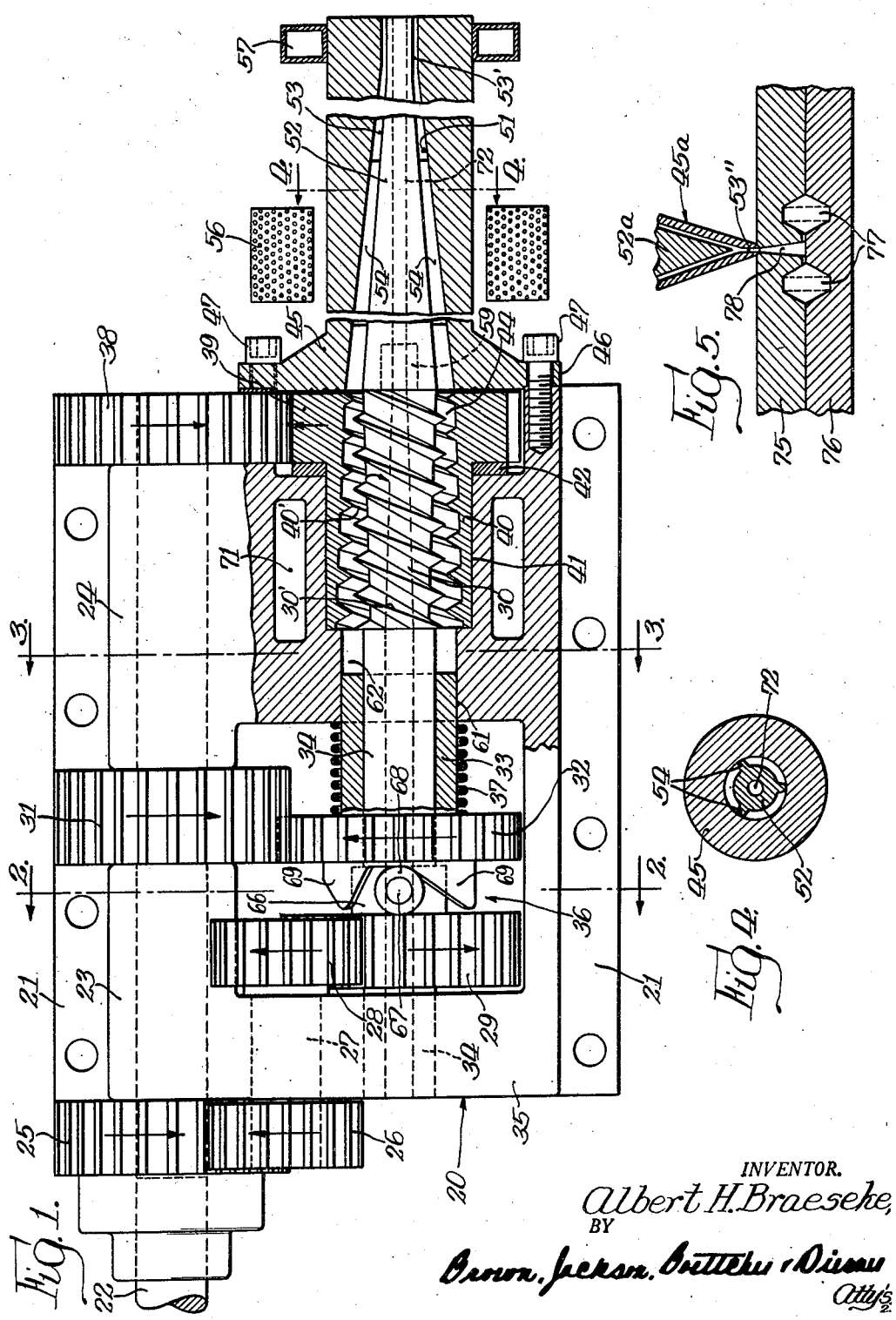
INVENTOR.
Albert H. Braeseke,
BY
Brown, Jackson, Boettcher & Dienner
Atty's April 3, 1951 A. H. BRAESEKE 2,547,151
EXTRUDING MACHINE
Filed Sept. 15, 1945 4 Sheets-Sheet 2
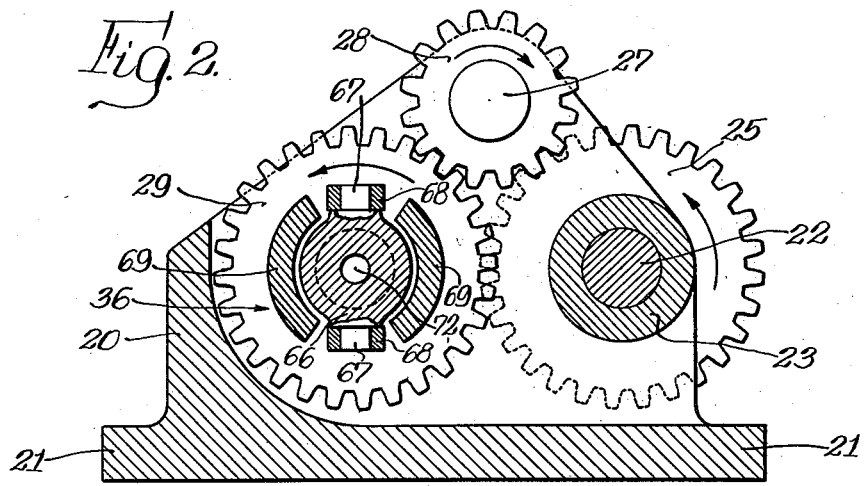
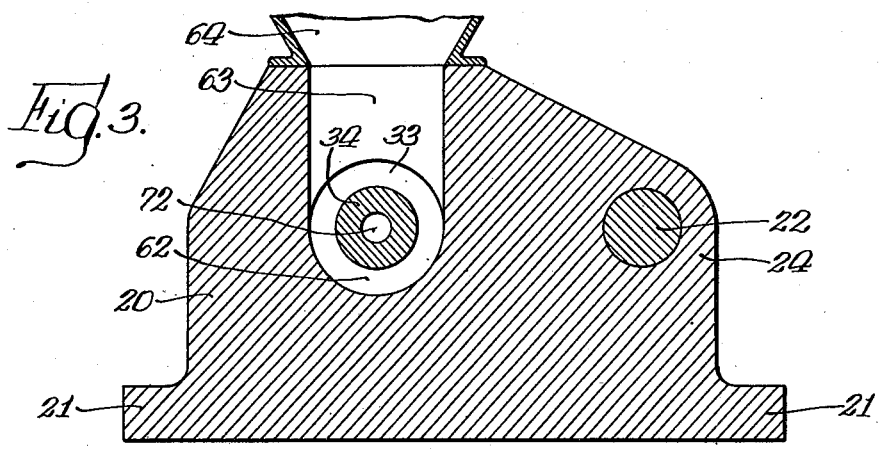
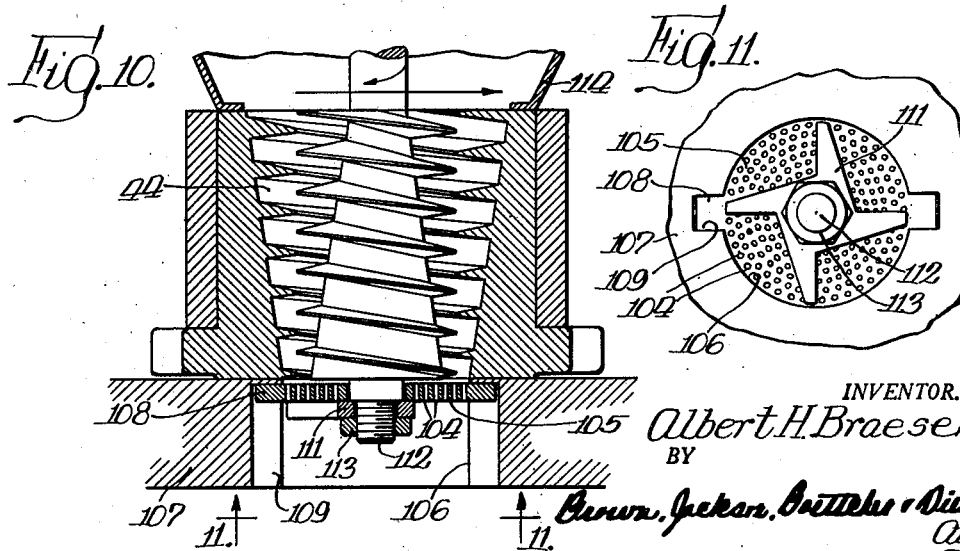
INVENTOR.
Albert H. Braeseke,
BY

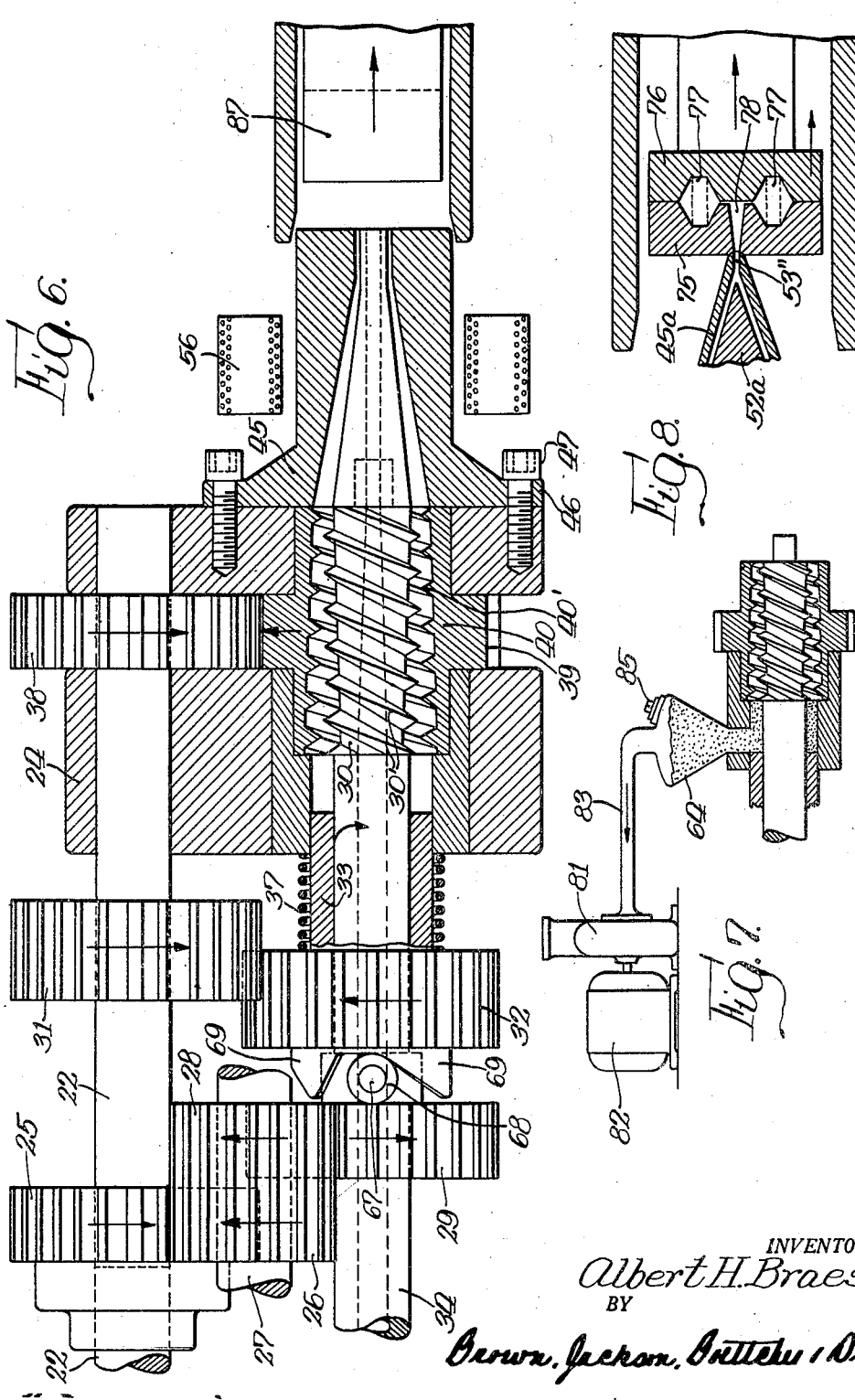

April 3, 1951  A. H. BRAESEKE  2,547,151
EXTRUDING MACHINE
Filed Sept. 15, 1945  4 Sheets-Sheet 4
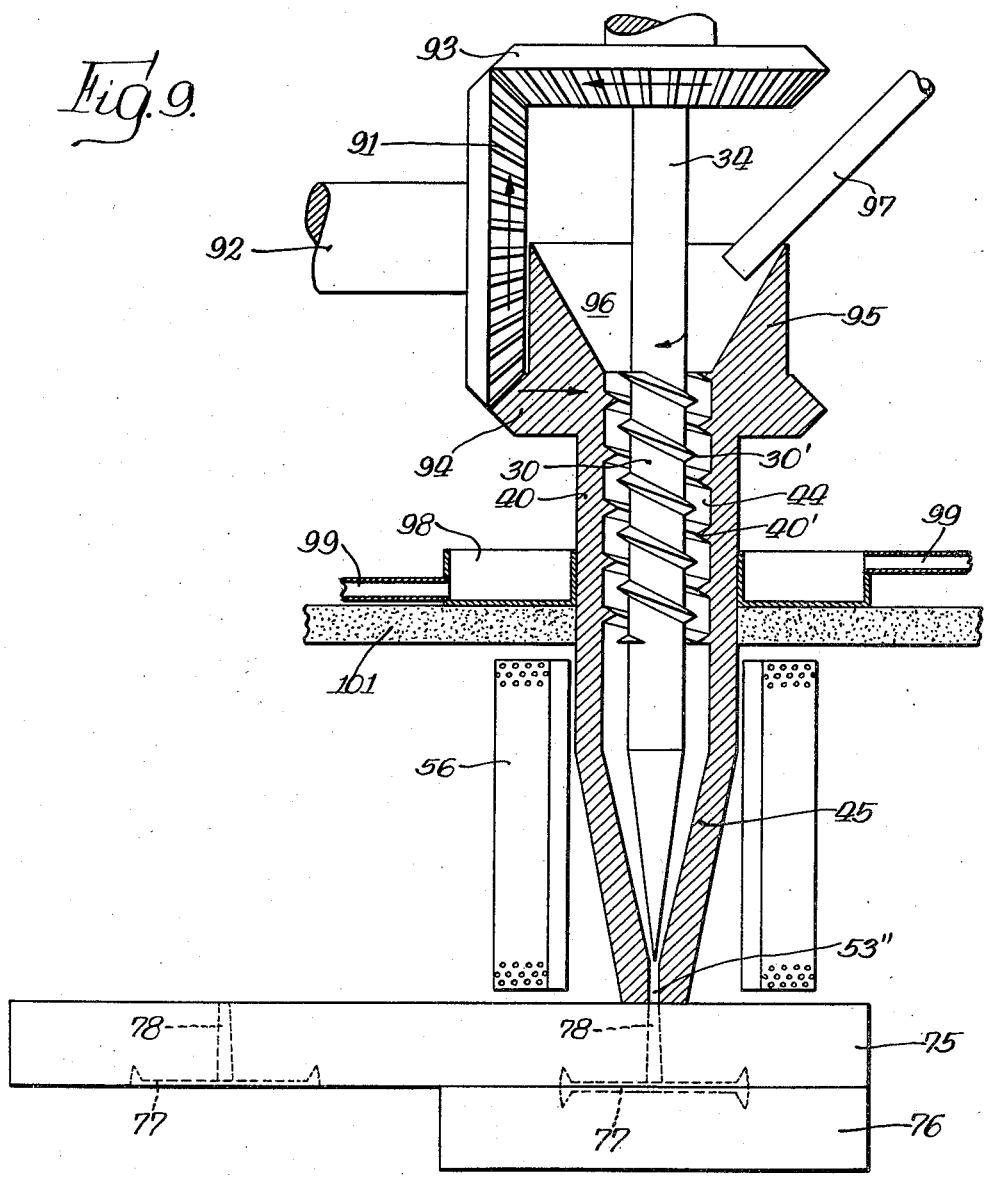
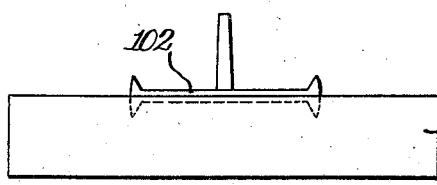
INVENTOR.
Albert H. Braeseke,
BY Patented Apr. 3, 1951

2,547,151

UNITED STATES PATENT OFFICE 2,547,151

EXTRUDING MACHINE

Albert H. Braeseke, Chicago, Ill.

Application September 15, 1945, Serial No. 616,630

11 Claims. (Cl. 18—12)

The present invention relates to an extruding machine which has been devised primarily for extruding plastic materials, although, as will hereinafter appear, the machine is also adapted to the extrusion of a wide variety of other materials, such as semi-solid materials, granular materials, and the like.

One of the principal objects of the invention is to provide an extrusion machine capable of exerting extremely large extrusion pressures without the possibility of slip or shearing of the material in the machine.

Another important object of the invention is to provide a machine which will exert a substantially constant extrusion pressure at all times on the material being extruded.

The two above recited objects are obtained by using an improved construction and arrangement of concentric inner and outer conveyor screws having opposite directions of lead having mating pitch from end to end thereof and opposite directions of rotation at speeds which maintain said screws in continuously mating travel and which act on inner and outer layers of the material being extruded, whereby the material virtually functions as a continuous nut or piston which is driven forwardly by the combined action of these male and female screws. The high pressures obtainable by the present machine enable the product or output of the machine to be made of a greater density, which is very desirable. The extremely high pressures obtainable also enable the machine to handle other material which could not be handled at lower pressures. The constancy of pressure obtainable by the present machine is also important because it enables the heat cycle to be fixed with regard to the material cycle or material input, so that a substantially constant density is maintained at all times in the extruded material. The positive cycle or linear motion of the material through the machine permits the extrusion or injection molding of thermosetting plastics (Bakelite, pheno formaldehyde-urea-formaldehyde etc.) the time cycle being arranged so that in the extrusion method the plastic sets when going through the die, and in the injection molding method the plastic sets when in the mold.

Another object of the invention is to provide improved feeding mechanism for feeding the material to the screw elements. In its preferred embodiment, this feeding mechanism exerts a reciprocating ram action on the material substantially in line with the screw elements.

Another object of the invention is to provide improved thermal control means for controlling the temperature of the material at different stages in its travel through the machine.

Other objects, advantages and features of the invention will be apparent from the following detail description of several embodiments of the invention. In the accompanying drawings illustrating such embodiments:

Figure 1 is a plan view, partly in section, of one embodiment of the invention particularly adapted to the extruding of plastic materials;

Figure 2 is a transverse sectional view taken approximately on the plane of the line 2—2 of Figure 1 and looking in the direction of the arrows;

Figure 3 is likewise a transverse sectional view taken on the plane of the line 3—3 of Figure 1 and looking in the direction of the arrows;

Figure 4 is a detail sectional view through the extruding nozzle, taken approximately on the plane of the line 4—4 of Figure 1;

Figure 5 is a fragmentary sectional view showing an injection molding nozzle adapted to the machine;

Figure 6 is a somewhat diagrammatic sectional view similar to Figure 1 but showing the several gears schematically, this latter embodiment being particularly adapted to the extrusion of powder metal;

Figure 7 is a diagrammatic view of this latter embodiment, illustrating the use of suction or vacuum apparatus for removing air from the powder metal;

Figure 8 illustrates the use of an injection molding nozzle in connection with this latter embodiment of the invention;

Figure 9 is a diagrammatic sectional view of another embodiment of the invention wherein the screw elements are disposed vertically, this embodiment being particularly adapted to metallic die casting operations;

Figure 10 is a vertical sectional view showing my invention adapted to a meat grinder or food grinder; and Figure 11 is a bottom end view of the latter, as indicated by the line 11—11 of Figure 10.

Referring first to the embodiment illustrated in Figures 1, 2, 3 and 4, this construction comprises a main frame in the form of a substantially rectangular casting 20, the base of which is formed with projecting apertured bolting flanges 21 by which the frame can be secured to a pedestal base, bench or the like. A main drive shaft 22 extends longitudinally through the rear portion of the frame, being journaled in relatively long bearing bosses 23 and 24 formed as a part of the frame. This drive shaft is driven from any suitable source of power, and may be driven through a variable speed mechanism capable of driving the machine at different speeds. At the left hand end of the frame, the drive shaft 22 carries a spur wheel 25 which drives a spur pinion 26 mounted on the left hand end of a countershaft 27 which is journaled in this portion of the frame. The right hand end of the countershaft 27 carries a spur pinion 28 which meshes with a spur wheel 29 which drives the male or inner conveyor screw 30. It will be noted that the gear 29 drives the inner conveyor screw 30 in a clockwise direction of rotation, as viewed from the left hand end of the gear 29 and screw 30. Referring back to the main drive shaft 22, this shaft also drives a relatively wide spur wheel 31 which is mounted between the bearing bosses 23 and 24 and which meshes with a narrower spur wheel 32. The latter spur wheel is secured to or formed integral with a rotating and reciprocating sleeve 33 which functions as an automatic feeding ram for feeding the material to the conveyor screws. The wide face of the driving spur wheel 31 accommodates the axial shifting movement of the driven wheel 32. The sleeve 33 is rotatably mounted on the rearwardly extending driving shank 34 of the male screw element 30, this shank portion extending through the gear 29, to which it is secured, and having its rear end journaled in the leg 35 of the supporting frame. It will be noted that the feed drive gear wheel 32 rotates in the opposite direction to the screw driving gear wheel 29, and these opposite directions of rotation are made effective through a cooperating cam and roller arrangement 36 between these two gear wheels for causing axial feeding motion of the gear wheel 32 and sleeve 33 towards the right. A return spring 37 returns the gear wheel 32 and sleeve 33 to the left. The cam and roller arrangement 36 will be described in detail later.

The right hand end of the main drive shaft 22 carries a spur wheel 38 which meshes with a spur wheel 39 formed integrally with the outer or female screw element 40. By reason of the fact that the countershaft gearing 26, 27 and 28 is interposed between the driving gear 25 and driven gear 29 which drives the male conveyor screw 30, whereas the driving gear 38 meshes directly with the driven gear 39 for driving the female conveyor screw 40, it follows that these two screws will rotate in opposite directions. The opposite rotative speeds preferably are substantially the same, although the two screws may be arranged to rotate at different speeds, if desired. The sleeve portion of the female conveyor screw 40 has a cylindrical outer surface which is journaled for rotation in a cylindrical bearing bore 41 formed in the frame casting 20. A thrust washer 42 is interposed between this bearing portion 41 and the gear wheel flange 39 projecting from the right hand end of the conveyor screw sleeve. The feeding or conveying space between the inner and outer screws 30 and 40 is designated 44, the right hand end of this feeding chamber discharging into an extruding nozzle 45. The latter is provided with a bolting flange 46 which is secured by bolts or cap screws 47 to the end face of the casting 20 in line with the conveyor screws. This extruding nozzle or head 45 is preferably formed with a tapered bore 51 through which extends a tapered filler core 52, whereby to form a discharge passageway 53 therebetween diminishing in diameter and cross-sectional area. The extreme end of this passageway 53 may be of cylindrical formation, as indicated at 53', if desired, the extruded material issuing from this type of extrusion nozzle in the form of a continuous tube. The filler core 52 is held properly centered in the passageway 53, 53' by a plurality of angularly spaced spacing ribs 54, as clearly shown in Figure 4. Provision is made for heating the intermediate portion of the extrusion nozzle 45, such as by a resistance heater, induction heater, dielectric heater, or other suitable heating means indicated diagrammatically at 56. Under some operating conditions it may be desirable to cool the tip of the extrusion nozzle 45, such as when the extruded material is discharged directly upon a conveyor or other receiving means, and, accordingly, I have provided a cylindrical jacket 57 which can be arranged to have a cooling medium circulated therethrough. Under some operating conditions, this jacket 57 might be converted to heating purposes by circulating a heating medium therethrough. The inner conveyor screw 30 has bearing support at its right hand end in the nozzle core 52, such as by extending a bearing stud 59 from the end of the conveyor screw and seating it in a counterbore in the nozzle core 52. The high pressure conveying action of the oppositely rotating screws 30, 40 will be described in detail after first describing the action of the automatic feeding ram 33 for feeding the material to the screws.

As previously described, this feeding ram 33 rotates on the outer surface of the stem portion 34 of the inner conveyor screw, rotating with a snug fit on this stem portion and in the opposite direction thereto. The cylindrical outer surface of the feeding ram has a snug sliding fit in a cylindrical bore 61 which is formed as a reduced extension of the larger cylindrical bore 41. A cylindrical feeding cavity 62 is thereby defined between the stem 34 and bore 61, and longitudinally between the ram 33 and the ends of the conveyor screws. Referring to Figure 3, a feed chute 63 extends downwardly through the top of the casting 20 and opens into the feeding cavity 62. The upper end of the chute 63 may lead from a hopper 64, conveyor belt, screw conveyor, or any other type of apparatus or device for supplying material to the machine. Referring now to the cam and roller mechanism 36, this comprises a collar 66 projecting either from the screw stem 34 or from the face of the gear 29, this collar being provided with two diametrically opposite pins 67 (Figure 2). Mounted upon these pins are rollers 68. Projecting laterally from the adjacent face of the gear 32 are circularly arranged cam lobes 69 adapted to cooperate with the rollers 68. In the opposite rotation of the cams and rollers, the cams reciprocate longitudinally and thus slide the ram 33 back and forth. The leading edges of the cam lobes 69 have relatively gradual slopes, and the trailing edges preferably have relatively sharp slopes, whereby the feeding ram 33 has a relatively gradual feeding motion to the right for feeding the material into the screw conveyor space 44, and a relatively quick return motion under the action of the spring 37.

Referring now to the inner and outer conveyor screws 30 and 40 in greater detail, the direction of lead of the thread on the male screw 30 is opposite to the direction of lead of the thread in the female screw 40, these opposite directions of lead being so related to the directions of rotation of their respective screw elements that both conveyor screws simultaneously exert a feeding action on the material for forcing it in a direction from left to right. That is to say, considering the clockwise direction of rotation of the male screw 30 (as viewed from the intake end of the conveyor screw space), the thread on this inner screw has a left hand direction of lead so that this clockwise direction of rotation will cause the material to be forced from left to right in the screw conveyor space 44. Similarly, considering the counterclockwise direction of rotation of the outer conveyor screw 40, the internal thread in this conveyor screw has a right hand direction of lead so that this counterclockwise direction of rotation will also cause the material to be forced from left to right in the space 44. The major diameter of the thread 30' on the male screw 30 remains constant throughout the length of this screw, and, similarly, the minor diameter of the thread 40' within the female screw 40 remains constant throughout the entire length of this screw, the major diameter of the male thread being smaller than the minor diameter of the female thread so as to provide adequate clearance space between these threads. The extruding space 44 between the two conveyor screws may be of uniform cross-sectional area from end to end, or it may be of diminishing cross-sectional area toward the discharge end for the purpose of increasing the pressure on the material being extruded. In the embodiment of Figure 1 I have illustrated the latter arrangement, which is obtained by having the minor diameter of the thread 30' increase toward the discharging end of the screw 30, and by having the major diameter of the thread 40' decrease toward the discharging end of the screw 40. Thus, the diminishing cross-sectional area of the conveyor space 44 increases the pressure and density in the material being extruded toward the discharge end of the two screws. The threads 30' and 40' are preferably tapered, but they may be square or of other profile if desired. Preferably, the two conveyor screws 30 and 40 are of the single-thread type, but they can be of the double-thread or triple-thread type if desired. Still further, these threads are shown as being of uniform pitch viz. from end to end of the screw members.

By virtue of thus employing male and female screws having opposite directions of lead and having opposite directions of rotation, I am able to obtain much higher extrusion pressures without the possibility of any slip or shearing of the material in traveling through the conveyor space. In the conventional single screw extruding machine there is the frequent possibility of slip of the material in the conveyor space, which limits the pressures obtainable, and also results in objectionable pressure variations. The constancy of pressure obtainable by virtue of the inner and outer conveyor screws having opposite directions of lead and opposite directions of rotation is an important feature because it enables the heat cycle to be fixed with regard to the material cycle or material input so that a substantially constant density can be maintained at all times in the extruded material. This is of decided advantage in extruding various types of plastic materials. Variations or adjustments of pressure and of density can be effected in the present machine, if desired, by varying the rate of feed of the material down through hopper 64 and chute 63 into the feeding cavity 62. This varies or adjusts the density of the material as extruded from the machine with regard to one given speed of rotation of the machine. As the body of material is being forced through the space 44 its function or action becomes very similar to that of an internally threaded nut and an externally threaded stud being forced with a positive action toward the discharge end of the space 44. There can be no slip of this material, and the feeding action is irreversible in the sense that the material cannot slip backwardly. The pressures which are capable of being exerted by these inner and outer screws 30 and 40 on an intervening body of proper consistency are limited only by the structural strength of the screw members 30 and 40. Surrounding the conveyor screws is a jacket 71 through which a heating fluid can be circulated, particularly when extruding thermosetting or thermoplastic materials, but which jacket might also be used for circulating a cooling medium under circumstances where it might be desirable to cool the material in its passage through the conveyor space 44. In this same regard, one or more longitudinal passageways 72 may be cored or drilled out in the inner conveyor screw 30 and in the nozzle core 52 for circulating a heating or cooling medium therethrough.

In Figure 5, the extrusion nozzle 45 has been substituted by an injection molding nozzle 45a. A core 52a within this injection molding nozzle guides the extruded material outwardly to a relatively small cylindrical discharge opening 53". A typical mold for plastic materials is represented by the upper and lower mold plates 75 and 76 having mold cavities 77 formed in their opposing faces. Sprue openings or similar passageways 78 lead through one of the mold plates to the cavities 77, and these passageways are brought into registration with the discharge outlet 53" of the injection molding nozzle 45a. In the extrusion of plastic materials, the viscosity or solidity of the plastic material may be retained at such point while traveling through the conveyor screw passageway 44 that the conveyor screws 30 and 40 are capable of exerting very high pressures on the material, almost as though it were solid material. One control governing the plasticity of this material in the passageway 44 is the thermal control which can be exercised through the jacket 71 and through the cored passageways 72. After the extruded material leaves the passageway 44 its temperature may be raised to a higher point so as to obtain greater fluidity for better extrusion and for better filling of mold cavities, etc. This increased temperature can be brought about in the extruding nozzle 45 by the action of the resistance or induction heater 56 and the jacket 57.

Figures 6, 7 and 8 illustrate a typical adaptation of my invention to the field of powder metallurgy. My improved extruding machine is capable of creating the extremely high pressures which are so often desirable in the field of powder metallurgy. The construction for handling powder metal can be practically the same as the embodiment above described. Accordingly, in illustrating such an extruding machine for powder metal in Figure 6 I have shown many of the parts diagrammatically, this being particularly true of the various driving gears, these gears being designated with the same reference numerals as in Figure 1. In Figure 7 I have illustrated a supplementary feature which can be added to my improved extruding machine when extruding powder metal. This feature resides in the extraction of as much air, oxygen, gas, etc. from the powder metal as possible just prior to or at the time that the metal is being fed into and through the machine. As the powdered metal is compressed in its travel between the screws, the air and gases are forced back toward the intake ends of the screws. In the diagrammatic showing of Figure 7, this is accomplished by any suitable suction pump 81 driven by an electric motor or other suitable source of power 82. This suction pump is connected through a suction conduit 83 with the upper end of a closed hopper 64 which feeds the powder metal to the force feed cavity 62. After the hopper 64 has been filled with a charge of powder metal introduced through the filler opening 85, the hopper is closed to atmosphere and the suction pump 81 is set into operation. The pump 81 may be of the type capable of developing a relatively high degree of vacuum, so that the suction action will be transmitted through a considerable length or depth of the charge of powder metal. The purpose of withdrawing as much air and gas as possible from the powder metal is to minimize oxidation, occluded gas in the charge, etc. The extruding action of the inner and outer conveyor screws 30 and 40 on the powder metal will be understood from the description of the preceding embodiment. If thermal action or control within the conveyor screw passageway 44 is desired, the surrounding part of the machine may be provided with jackets, similar to the jacket 71, or any other suitable thermal control means. Similarly, the extrusion nozzle 45 may be provided with an induction heater, resistance heater or other suitable heating means 56. The extrusion nozzle is shown as discharging upon a suitable conveyor 87.

Figure 8 illustrates the adaptation of an injection molding nozzle to this powder metal extruding machine. This injection molding nozzle 45a conforms substantially to the construction shown in Figure 5, and serves to discharge the powder metal into mold cavities 77 of suitable molds 75, 76.

Figure 9 illustrates the adaptation of my improved extruding machine to a metal die casting process. In this embodiment, the inner and outer extruding screws 30 and 40 are preferably disposed vertically to facilitate the feed of molten metal down into the extruding passageway 44 between the screw elements. By way of illustrating other possible driving arrangements for the two screw elements, I have shown a bevel gear set comprising a driving bevel gear 91 mounted on a drive shaft 92, and two driven bevel gears 93 and 94 which mesh with diametrically opposite points of the driving bevel gear so as to have opposite directions of rotation. The upper bevel gear 93 is secured to the shank or stem portion 34 of the inner male screw 30 so as to drive this screw element in the direction indicated. The lower bevel gear 94 is secured to the outer female screw 40 so as to drive this outer screw element in the opposite direction of rotation. Said lower gear 94 is formed with a raised inner flange 95 which forms a hopper or receiving receptacle 96 for receiving the molten metal. The molten metal is fed to the receptacle 96 through a trough or feed pipe 97. In this embodiment of extruding machine, the passageway 44 between the inner and outer screw elements is preferably of substantially uniform cross-sectional area from end to end. My invention contemplates congealing or solidifying the molten metal to a considerable extent within the passageway 44 so as to form in effect a nut of sufficient rigidity for the screw threads 30' and 40' to exert high pressures thereon. It is for this reason that the conveying passageway 44 between the screw elements is preferably made of uniform cross-sectional area from end to end, instead of diminishing in area toward the discharge end as in the preceding embodiments. However, some slight degree of taper might be employed in this embodiment. In order to effect this degree of congealing of the metal in the passageway 44, a cooling jacket or cooling pan 98 surrounds this portion of the outer screw member 40. Pipes 99 circulate water or other coolant through the cooling jacket 98. After being congealed sufficiently for the conveying screws to exert their high pressures thereon, the die casting metal is reheated to bring it back to a relatively fluid state for extrusion from the extrusion nozzle. Accordingly, suitable heating means is associated with the extrusion nozzle portion 45, preferably in the form of an induction or resistance heating coil 56. The nozzle may be formed relatively long so as to give the induction or resistance heating coil 56 a substantial time interval to bring the metal back to the desired temperature for discharge. A heat insulating partition 101 may be interposed between the heating coil 56 and the cooling jacket 98, with this heat insulating partition snugly surrounding the outer screw member 40. The nozzle 45 terminates in an injection molding orifice 53" adapted to discharge into the openings 78 of die casting mold parts 75 and 76. This mold construction may be of the multiple type, if desired, which enables one mold cavity 77 to be filled while the mold parts of another cavity are being separated for removing the finished die casting 102.

In this embodiment for extruding die cast metal, the screws 30 and 40 and the extruding nozzle 45 may be composed of high temperature steels or alloys, or they may have their surfaces composed of or suitably protected by high temperature refractory material so that they can withstand the maximum temperatures of the die cast metals. The machine can also be used for extruding other metals or alloys having higher melting points than die cast metal.

Figures 10 and 11 illustrate another embodiment of my invention utilized as a meat grinder or food grinder. The male screw 30 and female screw 40 are operatively connected with appropriate driving gearing so that these two screw members rotate in opposite directions. The minor diameter of the male screw and the major diameter of the female screw are preferably formed with a considerable degree of taper so that the conveying passageway 44 has a rapidly diminishing cross-sectional area toward the discharge end of the screw elements. At the discharge end, the material is forced under pressure through a multitude of perforations 104 in a perforated plate 105. This plate 105 sets in an opening 106 formed in a supporting base 107. The plate is held against rotation by projecting lugs 108 which extend from the plate and engage in longitudinal slots or guideways 109 formed in the supporting base 107. A wiping spider knife 111 rotates in contact with the underside of the perforated plate 105 for cutting the food which is being forced down through the perforations 104. This wiping spider knife is pinned or keyed to a stud 112 projecting down from the lower end of the male screw 30, being held on this stud by a nut 113. The meat or food is fed into the hopper 114 at the upper end of the female screw member 40, and is fed downwardly between the screw members and through the perforated plate 105 so as to grind or break up the meat or food into a comminuted mass.

While I have illustrated and described what

I regard to be the preferred embodiments of my invention, nevertheless it will be understood that such are merely exemplary and that numerous modifications and rearrangements may be made therein without departing from the essence of the invention.

I claim:

1. In an extruding machine, the combination of an inner conveyor screw, an outer conveyor screw surrounding said inner conveyor screw, said two screws engaging the same body of material therebetween internally and externally thereof, the direction of lead of said inner conveyor screw being opposite to the direction of lead of said outer conveyor screw, means for rotating said screws in opposite directions at the same speed, and pressure feed means for feeding material to the intake ends of said conveyor screws comprising a power driven ram disposed axially of said screws and having rotary and axial movement relatively to said inner conveyor screw.

2. In an extruding machine, the combination of outwardly acting male and inwardly acting female conveyor screws having opposite directions of lead, at least one of said screws being tapered in such direction as to cause the effective area between said screws to diminish toward the discharging ends of said screws, means for rotating said screws in opposite directions at the same speed, and means for feeding material into the intake ends of said screws comprising a power driven sleeve disposed axially of said screws and having rotary motion in the opposite direction to that of said male screw.

3. In an extruding machine, the combination of inner and outer concentric conveyor members, coacting inner and outer threads on said conveyor members having mating pitch from end to end thereof and having opposite directions of lead, means for feeding material into the intake ends of said conveyor members, means for rotating said members in opposite directions at the same speed so that both threads exert a conveyor action in the same direction on said material, the radial dimension between the minor diameter of said inner and the major diameter of said outer threads diminishing towards the discharge ends of said conveyor members, and a heating jacket surrounding said outer conveyor member while the radial dimension between the major diameter of said inner and the minor diameter of said outer threads remains the same toward said discharge ends.

4. In apparatus of the class described, the combination of male and female conveyor screws having opposite directions of lead, means for rotating said screws in opposite directions, said screws defining a screw conveying passageway therebetween, a shank portion extending from said male screw at the intake end of said passageway, a ram sleeve mounted on said shank portion for rotary and reciprocatory movement independently of said shank portion, a feeding cavity for receiving material, said ram sleeve forcing said material from said feeding cavity into said conveying passageway by reciprocatory motion, means for rotating said ram sleeve in a direction opposite to that of said shank portion, and cooperating cam and roller mechanism associated with said shank portion and with said ram sleeve for causing said ram sleeve to reciprocate.

5. In a machine for extruding plastics, the combination of an inner conveyor screw, an outer conveyor screw surrounding said inner conveyor screw, the direction of lead of said inner conveyor screw being opposite to the direction of lead of said outer conveyor screw, means for rotating said screws in opposite directions at the same speed, the minor diameter of said inner screw increasing and the major diameter of said outer screw decreasing toward the discharge ends of said screws whereby said screws define a force-feed conveying passageway therebetween which diminishes in cross-sectional area toward the discharge ends of said screws, means for feeding material to the intake end of said conveying passageway, a heating jacket substantially surrounding said screws and adapted to receive a heating fluid for externally heating said conveying passageway between the screws, internal heating means comprising a longitudinal passageway within said inner screw adapted to pass a heating fluid into the screw for internally heating said inner screw and said conveying passageway, a nozzle receiving the material from the discharge end of said conveying passageway, a heating coil substantially surrounding one portion of said nozzle for heating the material in its passage through that portion, and a cooling jacket substantially surrounding the discharge end of said nozzle for cooling the material in its discharge from said nozzle.

6. In a machine of the class described, the combination of an inner conveyor screw, an outer conveyor screw surrounding said inner conveyor screw, both of said conveyor screws being of tapered thread formation and of mating pitch from end to end, the direction of lead of said inner conveyor screw being opposite to the direction of lead of said outer conveyor screw, means for rotating said screws in opposite directions at speeds which maintain said screws in continuously mating travel, said screws defining a force-feed conveying passageway therebetween which diminishes in cross-sectional area toward the discharge ends of said screws, means for feeding material to the intake end of said conveying passageway, external heating means substantially surrounding said screws for externally heating said conveying passageway between the screws, internal heating means comprising a longitudinal passageway within said inner screw for internally heating said inner screw and said conveying passageway, a nozzle receiving the material from the discharge end of said conveying passageway, heating means substantially surrounding one portion of said nozzle for heating the material in its passage through that portion, and cooling means substantially surrounding the discharge end of said nozzle for cooling the material in its discharge from said nozzle.

7. In a machine of the class described, the combination of an inner conveyor screw, an outer conveyor screw surrounding said inner conveyor screw, the direction of lead of said inner conveyor screw being opposite to the direction of lead of said outer conveyor screw, means for rotating said screws in opposite directions, said screws defining a force-feed conveying passageway therebetween, means for feeding material to the intake end of said conveying passageway comprising a pressure feed ram mounted coaxially of said inner screw for rotary and reciprocatory movement relatively thereto, means for rotating said ram in the opposite direction to said inner screw and reciprocating it relatively thereto, heating means adjacent said conveyor screws defining a heating zone for heating the material in the intake end of said force-feed conveying passageway, a nozzle receiving the material from the discharge end of this passageway, heating means adjacent an intermediate portion of said nozzle defining a heating zone for heating the material in its passage through such intermediate portion of the nozzle, and cooling means adjacent the discharge end of said nozzle for cooling the material in its discharge from the nozzle.

8. In a machine of the class described, the combination of an inner conveyor screw, an outer conveyor screw surrounding said inner conveyor screw, the direction of lead of said inner conveyor screw being opposite to the direction of lead of said outer conveyor screw, means for rotating said screws in opposite directions, said screws defining a force-feed conveying passageway therebetween, and means for introducing material into the intake end of said conveying passageway, the minor diameter of said inner screw increasing toward the discharge end of said conveying passageway and the major diameter of said outer screw decreasing toward said discharge end whereby said conveying passageway diminishes in cross-sectional area both externally and internally toward said discharge end.

9. In a machine of the class described, the combination of an inner conveyor screw, an outer conveyor screw surrounding said inner conveyor screw, the direction of lead of said inner conveyor screw being opposite to the direction of lead of said outer conveyor screw, said screws defining a force-feed conveying passageway therebetween, means for feeding material into the intake end of said passageway comprising a feed chute opening into a feeding cavity surrounding the shank of said inner screw, a main drive shaft extending substantially parallel with the axis of said conveyor screws, a spur gear on said drive shaft meshing with a cooperating spur gear associated with said outer conveyor screw for driving said latter conveyor screw in the appropriate direction for conveying material toward the discharge end of said conveying passageway, a countershaft extending substantially parallel with said main drive shaft, a pair of spur gears transmitting a drive from said main drive shaft to said countershaft, another pair of spur gears for transmitting a drive from said countershaft to the shank of said inner conveyor screw, whereby said inner conveyor screw is rotated in the opposite direction from the outer conveyor screw for feeding material toward the discharge end of said conveyor passageway, a ram sleeve surrounding said inner screw shank for reciprocatory and rotary movement thereon for feeding material from said feeding cavity into said force-feed conveying passageway, a spur pinion on said ram sleeve and a cooperating spur pinion on said main drive shaft for rotating said ram sleeve, said latter spur pinions having sufficient width of driving face to maintain driving engagement during shifting movement of said ram sleeve, axially projecting cams carried by said ram sleeve, cooperating rollers carried by the shank of said inner screw and adapted to cooperate with said axially extending cams for imparting inward feeding movement to said ram sleeve, and spring means for imparting outward retractive movement to said ram sleeve.

10. In a machine of the class described, the combination of an inner conveyor screw, an outer conveyor screw surrounding said inner conveyor screw, the direction of lead of said inner conveyor screw being opposite to the direction of lead of said outer conveyor screw, said screws defining a force-feed conveying passageway therebetween, means for feeding material into the intake end of said passageway comprising a feed chute opening into a feeding cavity surrounding the shank of said inner screw, a main drive shaft extending substantially parallel with the axis of said conveyor screws, a spur gear on said drive shaft meshing with a cooperating spur gear associated with said outer conveyor screw for driving said latter conveyor screw in the appropriate direction for conveying material toward the discharge end of said conveying passageway, a countershaft extending substantially parallel with said main drive shaft, a pair of spur gears transmitting a drive from said main drive shaft to said countershaft, another pair of spur gears for transmitting a drive from said countershaft to the shank of said inner conveyor screw, whereby said inner conveyor screw is rotated in the opposite direction from the outer conveyor screw for feeding material toward the discharge end of said conveyor passageway, a ram sleeve surrounding said inner screw shank for reciprocatory and rotary movement thereon for feeding material from said feeding cavity into said force-feed conveying passageway, a spur pinion on said ram sleeve and a cooperating spur pinion on said main drive shaft for rotating said ram sleeve, said latter spur pinions having sufficient width of driving face to maintain driving engagement during shifting movement of said ram sleeve, and cooperating cam and roller members carried by said ram sleeve and the shank of said inner screw for imparting reciprocatory movement to said ram sleeve.

11. In a machine of the class described, the combination of an inner conveyor screw, an outer conveyor screw surrounding said inner conveyor screw, both of said conveyor screws being of tapered thread formation and of mating pitch from end-to-end, the direction of lead of said inner conveyor screw being opposite to the direction of lead of said outer conveyor screw, means for rotating said screws in opposite directions at speeds which maintain said screws in continuously mating travel, said screws defining a force feed conveying passageway therebetween which diminishes in cross-sectional area toward the discharge ends of said screws, and means for feeding material to the intake end of said conveying passageway.

ALBERT H. BRAESEKE.

REFERENCES CITED

The following references are of record in the file of this patent:

UNITED STATES PATENTS

| Number | Name | Date |
|---|---|---|
| 858,354 | Sharpneck | June 25, 1907 |
| 1,516,841 | Buttfield | Nov. 25, 1924 |
| 1,800,180 | Day | Apr. 7, 1931 |
| 1,902,295 | Shook | Mar. 21, 1933 |
| 1,959,628 | Jacobson | May 22, 1934 |
| 2,051,688 | Dunsheath | Aug. 18, 1936 |
| 2,127,857 | Bond | Aug. 23, 1938 |
| 2,175,054 | Ferngren et al. | Oct. 3, 1939 |
| 2,245,640 | Beattie | June 17, 1941 |
| 2,384,521 | Andersen | Sept. 11, 1945 |
| 2,401,236 | Fielitz | May 28, 1946 |